Figure 3:
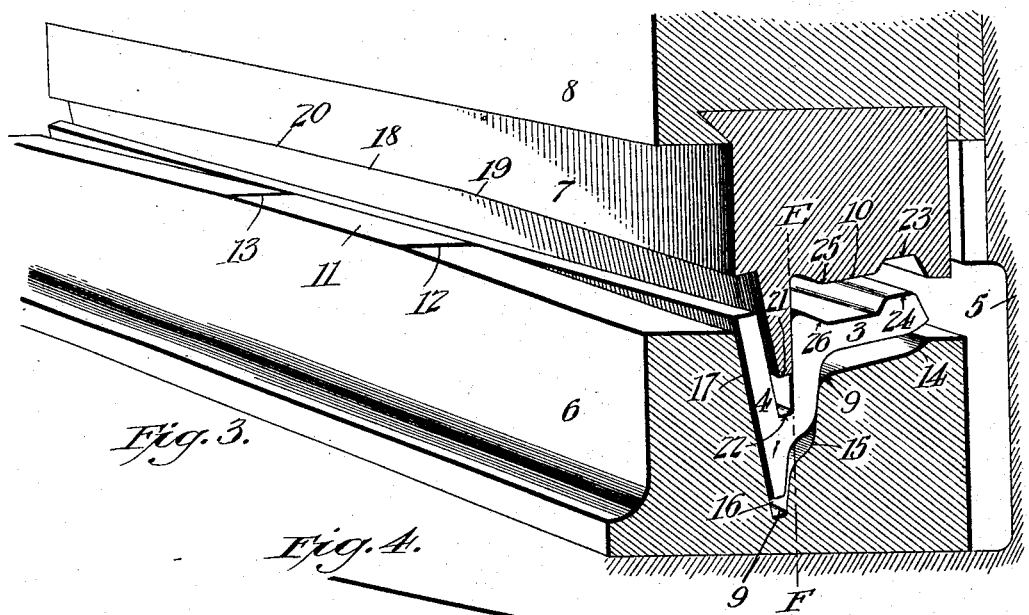

B. WOLHAUPTER.
PROCESS OF MAKING CAMBERED RAIL JOINT BARS.
APPLICATION FILED APR. 24, 1913.
1,172,655.
Patented Feb. 22, 1916.
5 SHEETS—SHEET 1.
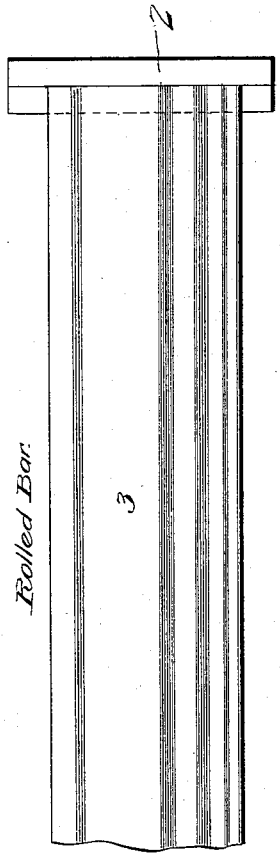
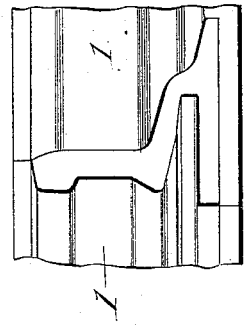
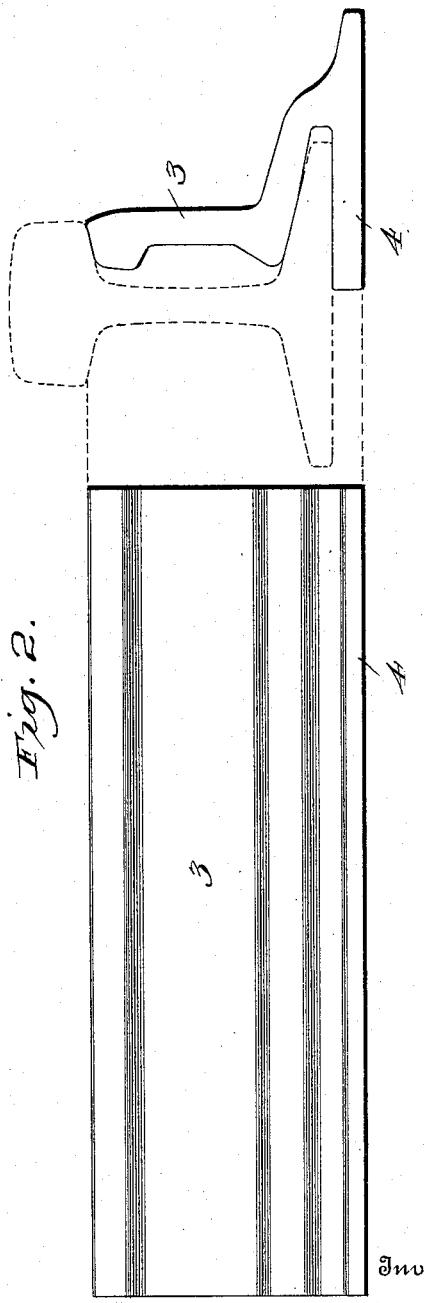
Inventor
Benjamin Wolhaupter,
By
his Attorney B. WOLHAUPTER.
PROCESS OF MAKING CAMBERED RAIL JOINT BARS.
APPLICATION FILED APR. 24, 1913.

1,172,655.

Patented Feb. 22, 1916.
5 SHEETS—SHEET 3.

Witnesses
T. L. Mochavel
Harry B. Rook

Inventor
Benjamin Wolhaupter
By
Luis Attorney

B. WOLHAUPTER.
PROCESS OF MAKING CAMBERED RAIL JOINT BARS.
APPLICATION FILED APR. 24, 1913.
1,172,655.  Patented Feb. 22, 1916.
5 SHEETS—SHEET 4.
Fig. 8.
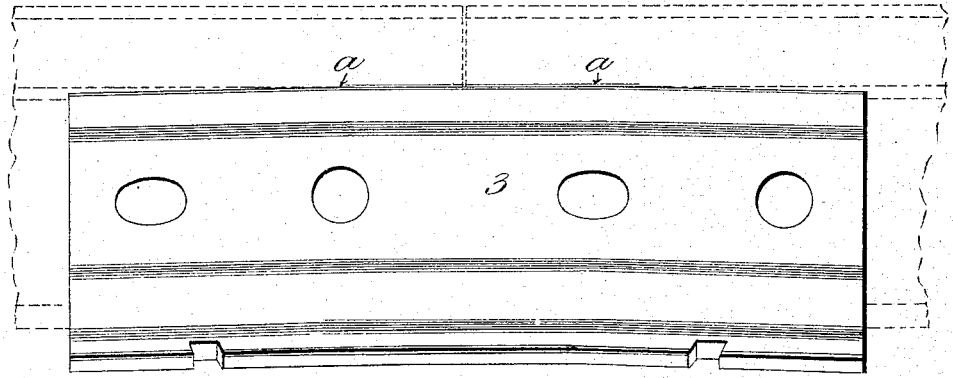
Fig. 7.  Fig. 9.
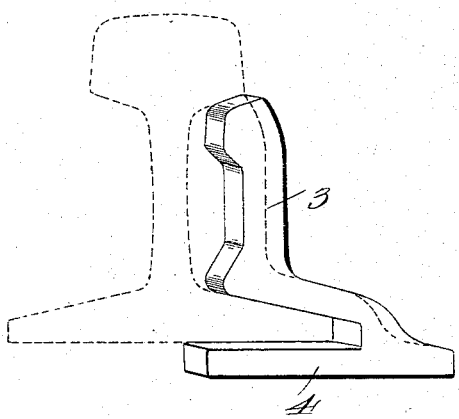 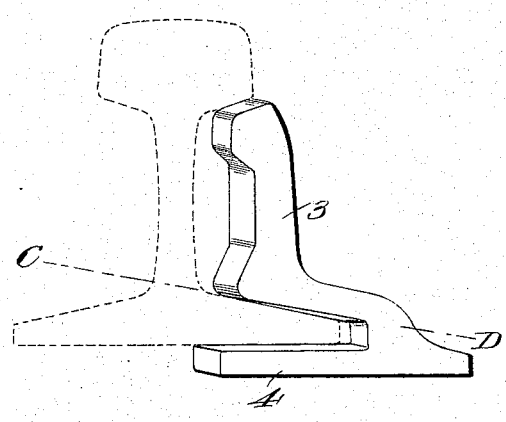
Inventor
Benjamin Wolhaupter,
Witnesses
T. L. Mockabee
Harry B. Rook
By
his Attorney

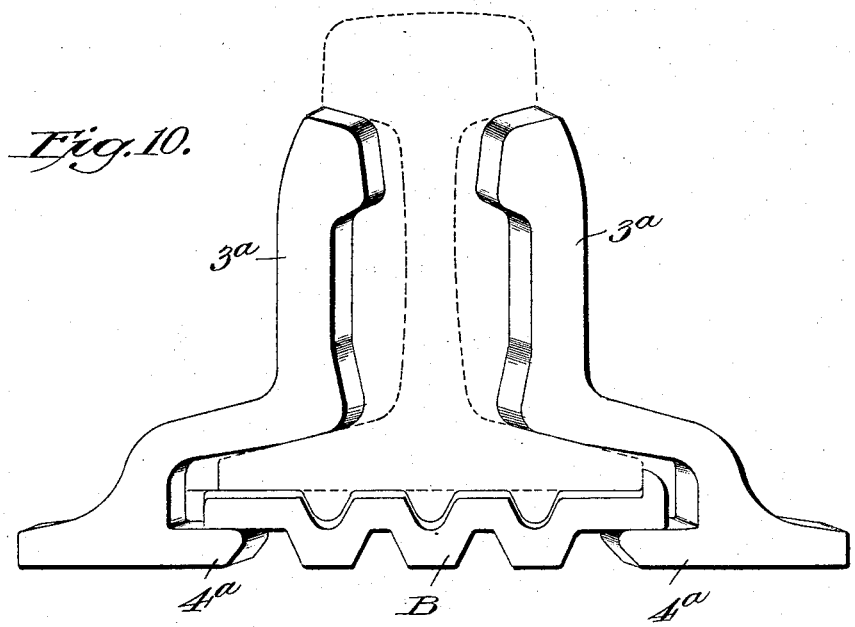
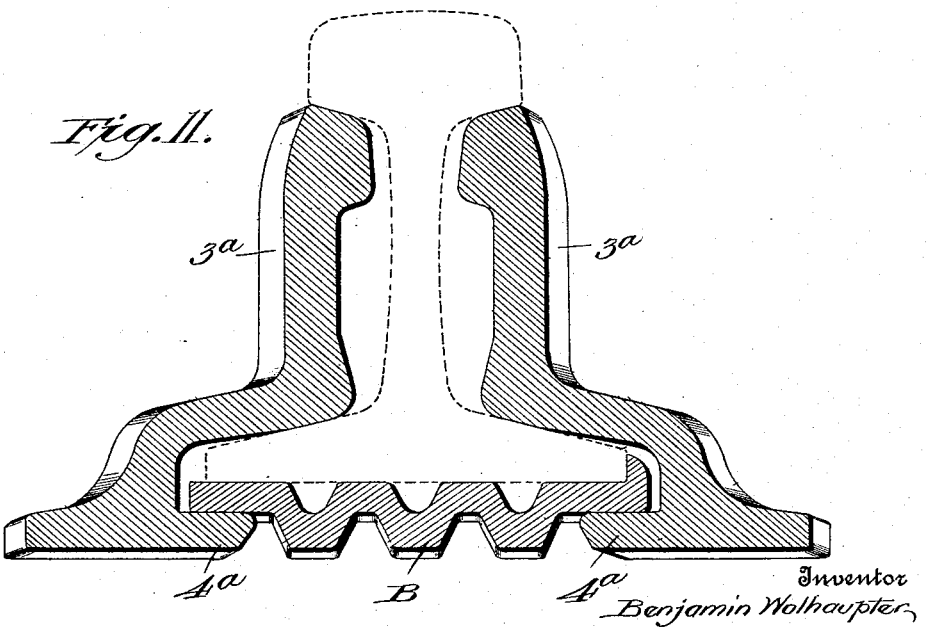

UNITED STATES PATENT OFFICE.

BENJAMIN WOLHAUPTER, OF NEW ROCHELLE, NEW YORK, ASSIGNOR TO THE RAIL JOINT COMPANY, OF NEW YORK, N. Y., A CORPORATION OF NEW YORK.

PROCESS OF MAKING CAMBERED RAIL-JOINT BARS.

1,172,655.      Specification of Letters Patent.      Patented Feb. 22, 1916.

Application filed April 24, 1913. Serial No. 763,348.

*To all whom it may concern:*

Be it known that I, BENJAMIN WOLHAUPTER, a citizen of the United States, residing at New Rochelle, in the county of Westchester and State of New York, have invented certain new and useful Improvements in Processes of Making Cambered Rail-Joint Bars, of which the following is a specification.

This invention relates to the manufacture of rail joints of the "cambered" type having a crowned-base for supporting the rail ends, and with the necessary clearance for the rails within the end portions of the joint. This type of joint provides means for binding the rail ends firmly at the center of the joint, while allowing the balance of the rails, within the end portions of the joint, to have free play under the wave motion of the track.

To this end the invention has in view a simple and practical method of manufacturing joint bars for a "cambered" or crowned-base rail joint, which process may be carried out by the use of simple mechanical appliances or expedients that are readily available, or can be easily adapted, for the purpose.

In this connection it is an object of the invention to preferably employ the ordinary angle or splice-bar mill as the shaping means for developing and shaping the joint bar section from the billet or bar blank, thus admitting of the production of a bar section in the passes of a rolling mill, and subsequently giving it a final set to produce the "cambered" joint effect by a simple operation involving the manipulation of the end portions only of the section, to slightly deflect such end portions, including both the splice member and the base member thereof, to a final position slightly distant from the plane of those members at the central part of the bar.

While various instrumentalities may be utilized in the carrying out of this invention, and various alterations may be made in the precise manner of handling the bar, both during its reduction and shaping, and also in its final setting to "cambered" form, without departing from the invention, one of the ways in which the process may be carried out in a practical manner is suggested in the accompanying drawings, in which—

Figure 4:
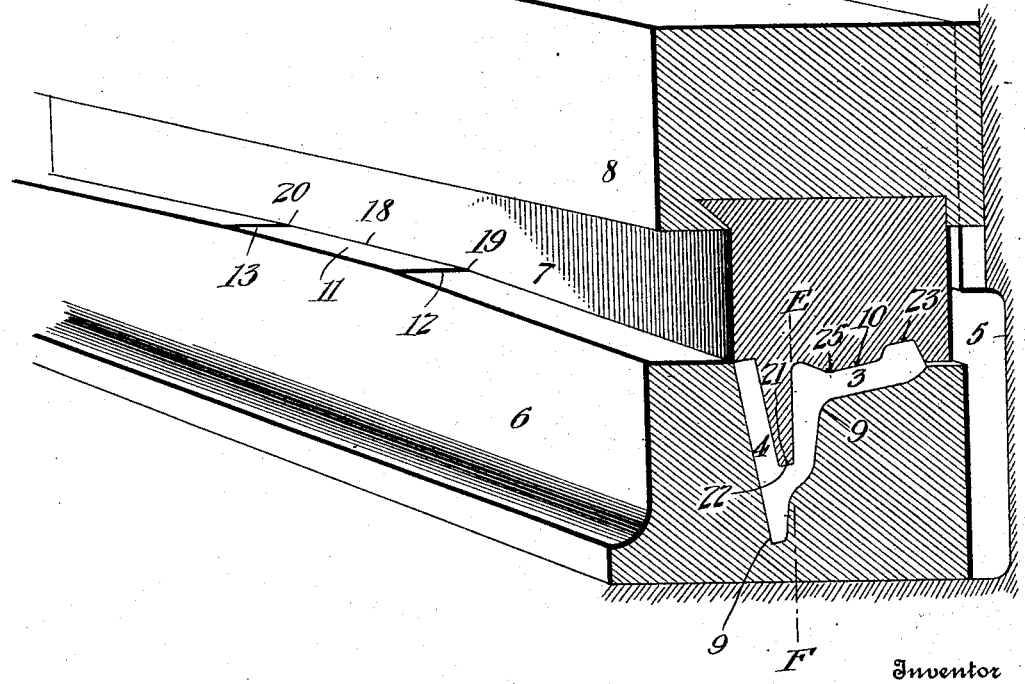
Figure 5:
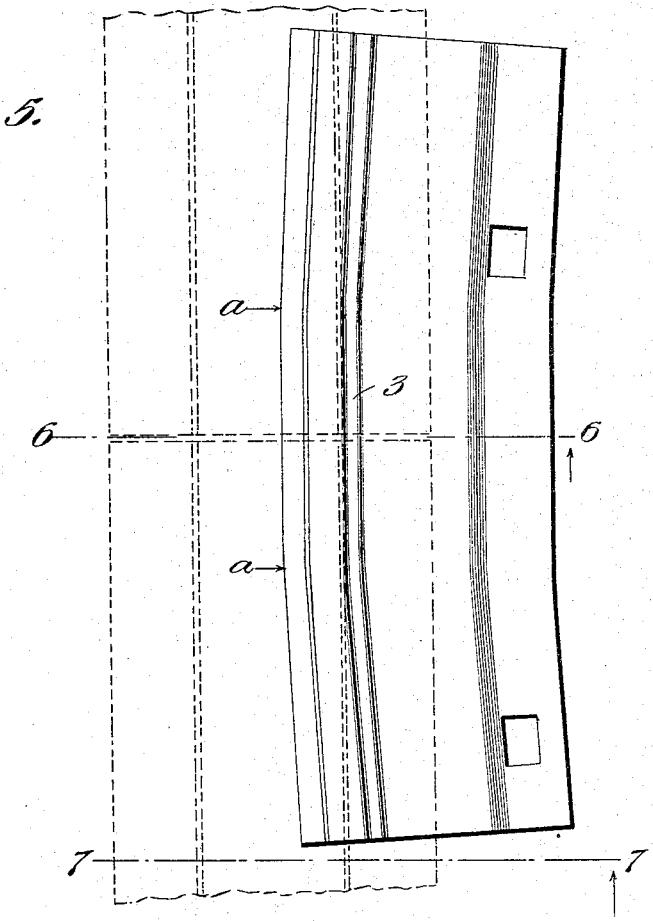
Figure 6:
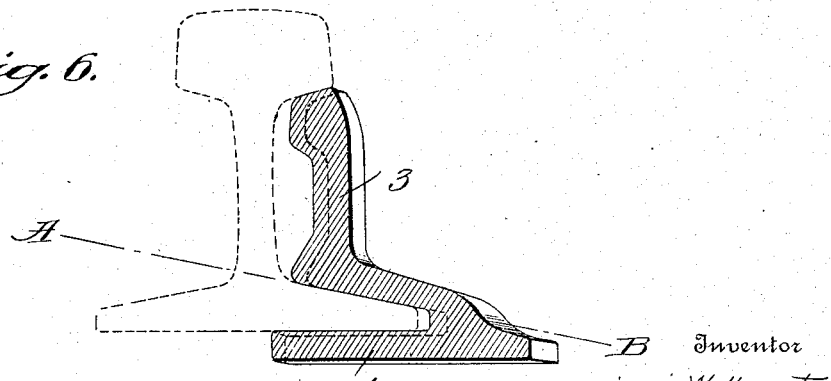

Figure 1 is a diagrammatic view illustrative of the first two steps of the process, namely, the final rolls of an ordinary rolling mill, and the cutting apparatus which severs or divides the rolled bar into rail joint lengths. Fig. 2 is a side elevation and projected end view of the rolled bar section as delivered from the rolling mill, or other shaping means, and sawed, sheared, or otherwise divided into a rail joint length. Figs. 3 and 4 are perspective views of one form of bending press or appliance that may be utilized for subjecting the end portions of the rail joint bar section to bending pressure, Fig. 3 showing the press open and about to operate upon the bar section of Fig. 2, and Fig. 4 showing the press closed, and the end portions of the bar bent to one side of and beyond the plane of the central portion. Fig. 5 is a top plan view of one of the "cambered" bars, as produced by the bending step of the process, illustrating by dotted lines the rail relation. Fig. 6 is a cross sectional view on the line 6—6 of Fig. 5, the line A—B illustrating that phase of the invention wherein the diagonal or oblique bending of the end portions of the bar may be not only in the same angular direction, but substantially at the same angle, as the angle of the top surface of the rail flange of the rail for which the bar is designed. Fig. 7 is an end view of the bent bar, the view corresponding to a section on the line 7—7 of Fig. 5. Fig. 8 is a side elevation of the "cambered" rail joint bar, showing by dotted lines the relative positions of the rail ends to a bar of this construction, and showing the bar punched for the bolts and slotted for the spikes. Fig. 9 is a view similar to Fig. 7, illustrating a different angle of bend that may be employed in the final pressing step, that is to say, an angle of bend which is on a less angle from the horizontal than top surface of the rail flange of the rail for which the bar is designed. Fig. 10 is an end view of the joint parts of a Wolhaupter type of rail joint with such parts in their proper relative set-up positions to illustrate the applicability of the present process for the production of joint bars of the Wolhaupter type. Fig. 11 is a central cross sectional view through the joint parts shown in Fig. 10.

In the description of the various steps of the process, like reference characters will designate corresponding parts in the several views of the drawings.

The first step of the process is the production of a rail joint bar preferably of a conventional design, such for instance as may be first represented by the continuous type of rail joint bar shown in Figs. 1 to 9 inclusive of the drawings. This bar may be developed from the billet and given its final configuration by any suitable shaping means, but, according to the present invention the preferable shaping means consists of the passes of an ordinary rolling mill, the final rolls of which are diagrammatically indicated in Fig. 1 of the drawings and are designated by the reference numeral 1. The bar as it comes from the mill, or other shaping means, is divided into rail joint lengths by any of the well known cutting devices designated by the numeral 2 in Fig. 1 of the drawings, and the bar section thus produced includes a main angle splice member 3 whose upright and foot portions are of finished form and adapted to fit the fishing spaces of the rails, as indicated by the dotted lines in Fig. 2 of the drawings. The said bar section also includes a lower rail-supporting base member 4 adapted to engage beneath the rail-bases and constitute a seat and support therefor.

The bar section in its first stage, as shown in Fig. 2 is in a finished form both as to shape or configuration, and as to properly fitting the surfaces of the rail, but is unfinished as to its final set. That is to say, the bar section in said first stage of construction includes an upper splice member and a lower base member both lying in the same plane throughout and both disposed in their final positions at the central part of the bar. Accordingly, it is proposed, by the present invention, to give the "cambered" set and effect to the joint bar section by subjecting the end portions thereof to a displacing or deflecting pressure in a direction diagonal to the plane of both the said splice member and lower base member, thereby deflecting or displacing the end portions of said members to final positions slightly distant from the planes of the said members at the central part of the bar. Various expedients or instrumentalities may be employed for subjecting the end portions of the bar section to this deflecting operation, the result of which is to not only carry the ends of the splice member to a position where the upper edge or head thereof will be disposed below and out of contact with the head of the rail when applied, but also to carry the ends of the rail supporting base member of the bar to a final position where it would be disposed below and out of contact with the rail base. However, for illustrative purposes, there is suggested in Figs. 3 and 4 of the drawings one form of a bending press, or offsetting machine, which may be utilized to effect this novel result by a simple bending operation. Referring to these figures of the drawings, it will be observed that the bending press shown in the drawings, includes a body or frame 5 having suitably arranged thereon a lower stationary die block 6, with which coöperates an upper movable die block 7 carried by a vertically moving presser head 8, supported and operated in any suitable manner to provide for raising and lowering the upper die block 7 according to the requirements of the work. The lower block 6 has formed therein a die recess 9 conforming in shape to the outside configuration of the joint bar to be operated upon, while the upper die block 7 is provided with a die surface 10 conforming in shape to the inside configuration of the bar.

The lower die block 6 is constructed with a central abutment portion 11, lying between the points designated by the reference numbers 12 and 13, which closely fits the bar section throughout its central portion or length, and from the points 12 and 13 the recess or pocket 9, in the lower die block, gradually slopes or inclines downwardly toward each end thus providing a well defined clearance space at the various points 14, 15, 16, and 17 between the walls of said recess 9 and the outside of the joint bar section prior to the bending thereof, as may be plainly seen from Fig. 3 of the drawings.

As shown, the cross section of the upper die block 7, at its central portion 18, between the points 19 and 20, corresponds to the joint bar as it is rolled or shaped in the first stage of Fig. 2, but from the said points 19 and 20 the end portions of the bending surfaces of the die block 7 slope downwardly to each extremity at the same relative slope as the end portions of the die recess 9, and, according to the particular illustration shown, the die blocks are preferably made and fitted to the machine in such a manner that the line or surface E—F is in the direction of the vertical movement of the presser head 8. It will be observed that this line E—F lies in a plane substantially parallel to the inclining under side of the foot of the angle member, and since this plane is maintained in the bending operation, the said under side of the foot of the the angle member is maintained in substantially the same plane throughout the joint bar, while the end portions of the head and base of the bar are crowded or displaced into different planes from the planes of the head and base of the bar at the central part of the latter.

Referring briefly to the operation of the bending press described, it will be understood that initially the vertically moving presser head 8 is elevated to a proper limit to permit the rolled and cut joint bar section to be placed in the recess 9 of the lower die block, so that the bar section will perfectly fit the same a short distance along the central abutment portion 11 between the points 12 and 13, while the end portions of the bar have the clearance, above explained, from the walls of the end portions of the die recess in the block. With the joint bar thus positioned in the lower die block, the press is operated to lower the upper die block, and in its downward movement against the joint bar, the extreme ends of said block at the points 21, 23 and 25 first come in contact with the extreme ends of the joint bar at the points 22, 24 and 26. As the upper die block continues its downward movement, the end portions of the joint bar are forced downwardly until they completely and perfectly fit the end portions of the die recess 9, and completely occupy the original clearance spaces 14, 15, 16 and 17, the result of which operation is to bend the end portions of the bar on the line E—F, from the center to each end, or in other words in a direction diagonal to the plane of both the upper splice member and lower base member at the center part of the bar, whereby the end portions of said members are deflected or bent to final positions slightly distant from the planes of said members at the central part of the bar, thus giving the cambered effect. After the operation described, the presser head is elevated sufficiently to permit the removal of the cambered bar, and the bending step may then be repeated with other bars.

In further explanation of that phase of the invention wherein the diagonal bending of the end portions of the bar is accomplished at substantially the same angle as that of the top surface of the rail flange, it will be noted by reference to Fig. 6 that under these conditions the central part of the joint bar will clamp tightly to the rail under the head of the rail, on top of the base, and below the latter, but that beginning at the points designated by the reference letter *a* in Fig. 5, the bar will leave the under side of the head of the rail and the bottom of the rail base, gradually opening up toward the end, but nevertheless will still bear on top of the rail base flange. In this form of the bar, when the same is embodied in a rail joint and the bolts tightened, the bar will give a firm bearing and support at the rail ends, but at the joint ends there will be a clearance below the head of the rail and below the base of the rail so that the rail may deflect downwardly under the load without moving or churning the joint.

A modification is shown in Fig. 9 wherein it is proposed to have an angle or bend C—D which is on a less angle from the horizontal than the top surface of the rail flange, the effect of which is that the joint bar, from the central part toward both ends, gradually leaves a clearance for the rails not only between the heads of the latter and the head of the bar and between the base of the rails and the base of the bar, but also a slight clearance between the top of the base flange of the rail and the joint bar, so that the rails may not only deflect downwardly in the joint but may also take an upward bend or deflection at the ends of the joint.

The joint bars made according to the present process are suitably punched and slotted, at any stage, and by any means, to make the usual provision for the track bolts and track spikes when said bars are set up in a rail joint, and since the invention is not limited to the development and manipulation of a joint bar strictly of the continuous type shown in Figs. 1 to 9 inclusive of the drawings, the applicability of the process to other forms of joint bars is illustrated in Figs. 10 and 11 of the drawings.

In the illustration of Figs. 10 and 11 of the drawings, there are shown the joint parts of a Wolhaupter type of rail joint, with the various parts in their relative set-up positions as they appear in a rail joint. In the production of a joint bar for this Wolhaupter type of rail joint, by means of the present process, the bar is subjected to the same shaping and bending operations already described and also includes the main splice member 3ª and a lower base member 4ª, the latter having a clamping engagement with an edge portion of a separate base plate B. However, in adapting the separate base plate B of the Wolhaupter type of joint to joint bars which have been subjected to the shaping and bending operations herein described, the said base plate is provided with a centrally crowned rail seat and support upon which the rail ends rest. This may be formed in a suitable press or die whose operations effect an upsetting or setting-up of the base plate, preferably at its central portion, so as to provide a well defined seat to give the rail ends a base support at the center of the joint, while the remaining or end portions of the base plate are out of contact with the bottoms of the rails and rest upon the end portions of the base members 4ª which are depressed by the bending operation.

In further explanation of the scope of the invention, it should be noted that the same is not limited to the feature of accomplishing the bending step in one operation by a movement of the end portions of the bar section in a direction diagonal to the plane of both the splice member and the lower base member of the bar. It will be apparent that since the bending movement is in a diagonal direction from the horizontal and vertical lines of the bar with reference to its applied position, consequently the same effect can be accomplished in two separate operations, namely, first by bending the end portions of the bar laterally and afterward bending the same vertically to produce the effect of carrying the ends of the splice member to a position where the heads thereof will be disposed below and out of contact with the heads of the rails when applied, and also carrying the end portions of the base member of the bar to positions below the plane of the central portion of said base member.

Other modifications of the invention within the scope of the appended claims as well as other applications thereof will be readily apparent to those familiar with the art without further description.

I claim:

1. The process of making cambered rail joint bars which consists in subjecting a bar blank to shaping means to produce a bar section having final form and position along the central part thereof, and subsequently laterally displacing the end portion of the bar in a direction substantially parallel to the inclination of the under side of the foot thereof.

2. The process of making cambered rail joint bars which consists in subjecting a bar blank to shaping means to produce a bar section having an angle member and a base member of final form and position along the central part of the bar, and subsequently displacing the end portions of the bar laterally in a diagonal direction to thereby bring the end portions of the head and base of the bar into new planes.

In testimony whereof I hereunto affix my signature in the presence of two witnesses.

BENJAMIN WOLHAUPTER.

Witnesses:
MARGARET MCAVOY,
K. MCNALLY.

Copies of this patent may be obtained for five cents each, by addressing the "Commissioner of Patents, Washington, D. C."